United States Patent
Lamich

(10) Patent No.: US 6,848,723 B2
(45) Date of Patent: Feb. 1, 2005

(54) QUICK CONNECT COUPLING FOR A HEAT EXCHANGER

(75) Inventor: Bernhard Lamich, Esslingen (DE)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 10/349,057

(22) Filed: Jan. 22, 2003

(65) Prior Publication Data

US 2003/0141047 A1 Jul. 31, 2003

(30) Foreign Application Priority Data

Jan. 30, 2002 (DE) .......................................... 102 03 521

(51) Int. Cl.$^7$ ............................................... F16L 39/00
(52) U.S. Cl. ........................ 285/319; 285/305; 285/921
(58) Field of Search .............................. 285/305, 309, 285/321, 921, 257

(56) References Cited

U.S. PATENT DOCUMENTS

| | | | | | |
|---|---|---|---|---|---|
| 4,735,440 | A | * | 4/1988 | Sauer | ........................... 285/110 |
| 4,786,085 | A | * | 11/1988 | Sauer et al. | .................. 285/24 |
| 4,887,849 | A | * | 12/1989 | Briet | ........................... 285/91 |
| 5,022,461 | A | * | 6/1991 | Potier et al. | ................... 165/76 |
| 5,062,478 | A | * | 11/1991 | Potier et al. | ................ 165/178 |
| 5,209,523 | A | * | 5/1993 | Godeau | ......................... 285/93 |
| 5,228,724 | A | * | 7/1993 | Godeau | ......................... 285/93 |
| 5,538,076 | A | * | 7/1996 | Nishida et al. | ................ 165/76 |
| 5,593,187 | A | * | 1/1997 | Okuda et al. | ................ 285/305 |
| 5,655,795 | A | * | 8/1997 | Strnad et al. | ................ 285/110 |
| 6,474,698 | B2 | * | 11/2002 | Dobler et al. | ................ 285/321 |

FOREIGN PATENT DOCUMENTS

| | | |
|---|---|---|
| DE | 19957946 | 6/2001 |
| DE | 10017679 | 9/2001 |

* cited by examiner

Primary Examiner—James M. Hewitt
(74) Attorney, Agent, or Firm—Wood, Phillips, Katz, Clark & Mortimer

(57) ABSTRACT

A quick connect coupling for connecting a fluid conduit to a header tank includes first and second engaged and sealed coupling parts. The first coupling part includes a radially inner hollow cylindrical wall with a radially outer surface and diametrically opposite, axially directed fingers spaced radially outward of the cylindrical wall and attached thereto. The second coupling part includes a generally circular radially inner wall sized to be axially received between the cylindrical wall and the fingers and has an interior surface facing the radially outer surface of the cylindrical wall. A radially inwardly opening groove is located in the interior surface and a circular seal is disposed therein to sealingly engage the radially outer surface of the cylindrical wall when the coupling is assembled. The second coupling part also includes a radially outer wall sized to fit about the sides of the fingers and a retaining clip carried by the radially outer wall and extends through slots to enter grooves in the outer surfaces of the fingers to effectuate assembly of the two coupling parts.

7 Claims, 7 Drawing Sheets

QUICK CONNECT COUPLING FOR A HEAT EXCHANGER

FIELD OF THE INVENTION

This invention relates to quick connect couplings, and more particularly, to a quick connect coupling for coupling a conduit for a heat exchange fluid to the header tank of a heat exchanger.

BACKGROUND OF THE INVENTION

Fluid conduits are conventionally connected to the headers or header tanks of heat exchangers to convey one heat exchange fluid to or from the heat exchanger from or to another part of the system with which the heat exchanger is associated. A commonplace example is a radiator employed for cooling the liquid coolant of a liquid cooled engine used for propulsion of a vehicle.

In many cases, the conduit is connected to a nipple on the exterior of the header or header tank and in fluid communication with the interior thereof by means of a hose clamp. Some hose clamps not only require placement at the proper location on the end of the hose as the hose is slipped over the nipple, but in addition, require manual tightening. Others utilize spring clips but still require considerable manipulation in terms of properly locating the spring clip and then releasing pressure on the clip to allow the same to close tightly upon the hose and the nipple within the hose at that location.

Both of these types of connections, while effective in preventing leakage at the interface of the conduit and the heat exchanger, require considerably manual manipulation and thus are not particularly economical, particularly in a manufacturing assembly operation. As a consequence, more recently, there have been proposals for so-called "quick-connect" couplings where it is merely necessary to fit one coupling half associated with the heat exchange fluid conduit to the other coupling half associated with the heat exchanger header.

One such proposal is found in German Patent Publication DE 100 17 679 C1 while another is found in German Patent DE 199 57 946 A1.

Ideally, such couplings should be made so as to occupy a minimum of space and require a minimum of axial movement of one coupling part toward the other to bring the two into sealing and coupled engagement. Moreover, particularly in the automotive field, heat exchangers such as radiators commonly employ header tanks which may be made of metal or which maybe injection molded of plastic. Ideally, the couplings should be such that it can be employed with tanks formed of either type of material. Of course, the couplings should retain the ability to achieve coupling with a minimum of axial movement and because of spacial constraints in the engine compartment of a typical vehicle, should occupy a minimum of space.

The present invention is directed to accomplishing one or more of the above goals.

SUMMARY OF THE INVENTION

It is a principal object of the invention to provide a new and improved quick connect coupling. More specifically, it is an object of the invention to provide a quick connect coupling for sealingly securing a heat exchange fluid conduit to the header or header tank (collectively referred to as "header tanks") of a heat exchanger.

An exemplary embodiment of the invention achieves the foregoing object in a construction that includes a first coupling part that may be mounted on one of the header tank or the conduit and a second coupling part on the other of the header tank and the conduit which is sealingly coupled to the first coupling part. The first coupling part includes a radially inner, hollow cylindrical wall defining an axis and a radially outer surface. It further includes diametrically opposite, axially directed fingers spaced radially outward of the cylindrical wall and attached thereto. The second coupling part includes a generally circular, radially inner wall size to be axially received between the cylindrical wall and the fingers and having an interior surface facing the radially outer surface of the cylindrical wall. A radially inwardly opening groove is located in the interior surface and a circular seal is disposed in the radially inwardly opening groove and is sealingly engageable with the radially outer surface of the cylindrical wall when the coupling is assembled. It further includes a radially outer wall sized to fit about the sides of the fingers. A retaining ring such as a clip is employed to hold the two in assembled relation.

In a preferred embodiment, the first coupling part further includes radially outwardly opening grooves in the sides of the fingers remote from the cylindrical wall and generally transverse to the axis while the second coupling part further includes slots in the radially outer wall generally transverse to the axis and alignable with the radially outwardly opening grooves in the fingers of the first coupling part. A retaining clip is disposed in the slots and enters the circumferentially directed grooves when the coupling is assembled.

In a preferred embodiment, the fingers on the first coupling part are arcuate about the axis and concave in the direction of the axis while the radially outer wall of the second coupling part includes diametrically opposite arcuate sections concave in the direction of the axis.

One preferred embodiment is especially adapted for use with a plastic header and the one of the coupling parts that is mounted on the header is plastic and is formed integrally with the header tank. Preferably such coupling part is the first coupling part and the hollow cylindrical wall opens to the interior of the header tank through a wall thereof and the fingers extend from such wall.

In another embodiment, particularly suited for use with a metal header tank, the first coupling part is on the metal header tank and the hollow cylindrical wall is formed in a wall of the header. The fingers are formed in an additional part which is fitted and secured to the header tank about the hollow cylindrical wall.

According the latter embodiment, in a preferred form thereof, the additional part is shaped to be complementary to the shape of the header tank at the hollow cylindrical wall so as to be fitted on the header tank and secured thereto by a metallurgical bond.

Other objects and advantages will become apparent from the following specification taken in connection with the accompanying drawings.

DESCRIPTION OF THE PREFERRED EMBODIMENTS

While the present invention, in its various embodiments, will be described herein in the environment of a tank to be applied to a header in a vehicular radiator, it is to be particularly observed that the invention may be susceptible to other uses and should not be considered as limited to use as a so-called radiator or as limited to use in a vehicle except insofar as expressly stated in the appended claims. Similarly, while the invention in its various embodiments will be described as a coupling for use with a header tank in a heat exchanger, it is to be understood that the invention can also be employed with efficacy in heat exchanger applications having unified header and tank constructions and tanks used with headerless heat exchangers as opposed to separable headers and header tanks. That is to say, references herein to a "header tank" are intended to collectively refer to tanks fitted to separate headers, the tank part of a unitary header and tank assembly and tanks used on headerless heat exchangers.

With the foregoing in mind, a first embodiment of the invention will be described with reference to FIGS. 1–6, inclusive. This embodiment of the invention is intended for use in a construction that employs a plastic header tank.

Figure 1:
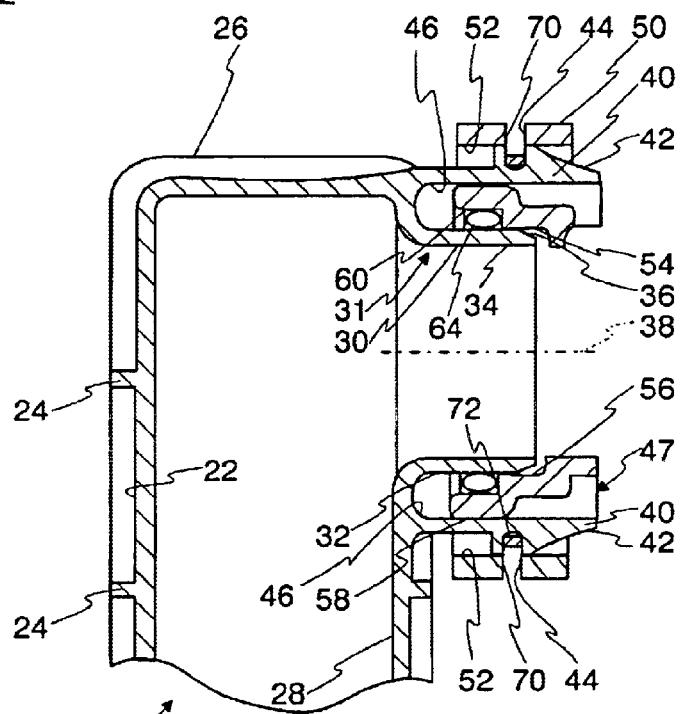
FIG. 1 is a fragmentary sectional view taken approximately along line 1—1 in FIG. 2.
Figure 4:
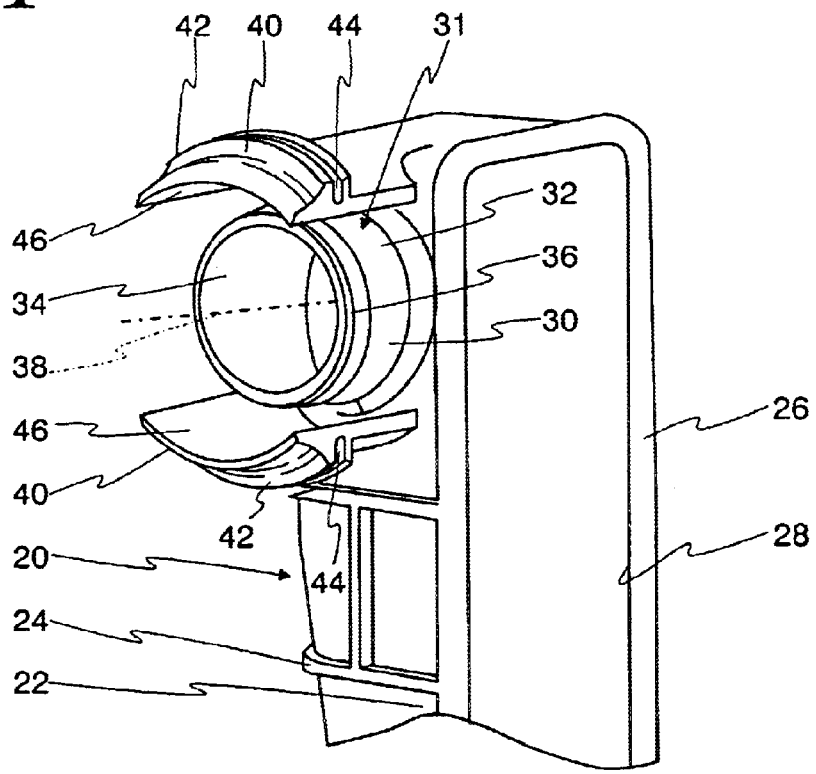
FIG. 4 is a fragmentary, perspective view illustrating a heat exchanger header tank with one coupling part connected thereto.
Figure 6:
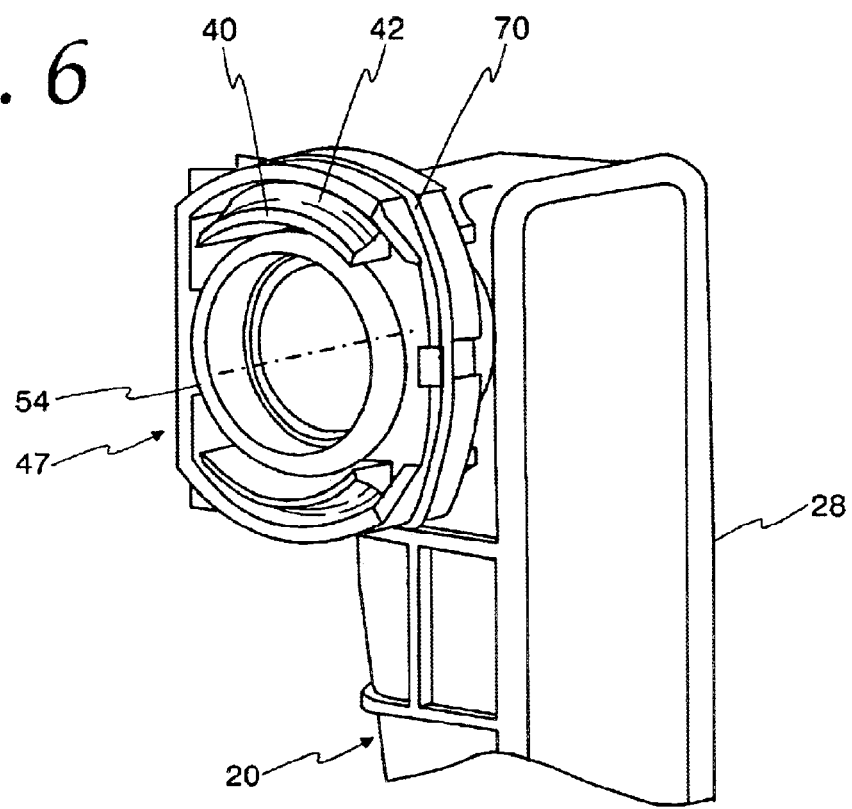
FIG. 6 is a fragmentary, perspective view showing both coupling parts assembled to one another.

Referring to FIGS. 1, 4 and 6, a plastic header tank, generally designated 20, is illustrated and includes an exterior wall 22 including reinforcing ribs 24 extending to a peripheral plastic flange 26 which, as is well known, sealingly abuts the header plate (not shown) of a heat exchanger header. The tank 20 also includes an interior wall 28 from which protrudes a hollow, generally cylindrical wall 30 which in turn has a exterior surface 32 and an interior surface 34. At its end remote from the interior wall 28 of the tank 20, the hollow cylindrical wall 20 includes, in its outer surface 32, a peripheral bevel 36 for purposes to be seen. The hollow cylindrical wall 30 forms a first part, generally designated 31, of the coupling of the invention and, of course, is in fluid communication with the interior of the tank 20. The hollow cylindrical wall 30 also defines an axis 38, namely, its cylindrical axis, which is the axis along which relative movement of two coupling parts take place during assembly.

A second component of the first coupling part 31 includes a pair of diametrically opposed fingers 40, perhaps best shown in FIGS. 1 and 4. As seen in FIG. 4, the fingers 40 are arcuate and concave in the direction of the axis 38. They include, near their ends remote from the tank 20, bevelled or ramped surfaces 42 which lead up to generally circumferentially extending (with respect to the axis 38) radially outwardly opening grooves 44. The grooves 44 are retaining grooves and employed in holding the coupling together when assembled. And while described as grooves in the embodiment shown in FIGS. 1–9, they could, at some locations, extend entirely through the fingers 40 so long as they do not sever completely the ramped surfaces 42 therefrom.

It is to be noted that a space that is generally annular exists between the outer surface 32 of the hollow cylindrical wall 30 and the concave, radially inner surfaces 46 of the fingers 40. This space is adapted to receive a radially inner part of a second coupling part, generally designated 47, as will be described in greater detail hereinafter.

It is also to be noted that in the case of the embodiment illustrated in FIGS. 1–6, both the hollow cylindrical wall 30 and the fingers 40 are integrally formed with one of the walls 22 of the tank 20. In the usual case, the tank 20, being of plastic, will be injection molded and the mold employed will incorporate cavities whereby the injection molding process will form the hollow cylindrical wall 30 and the diametrically opposite fingers 40 in the manner described previously.

Figure 2:
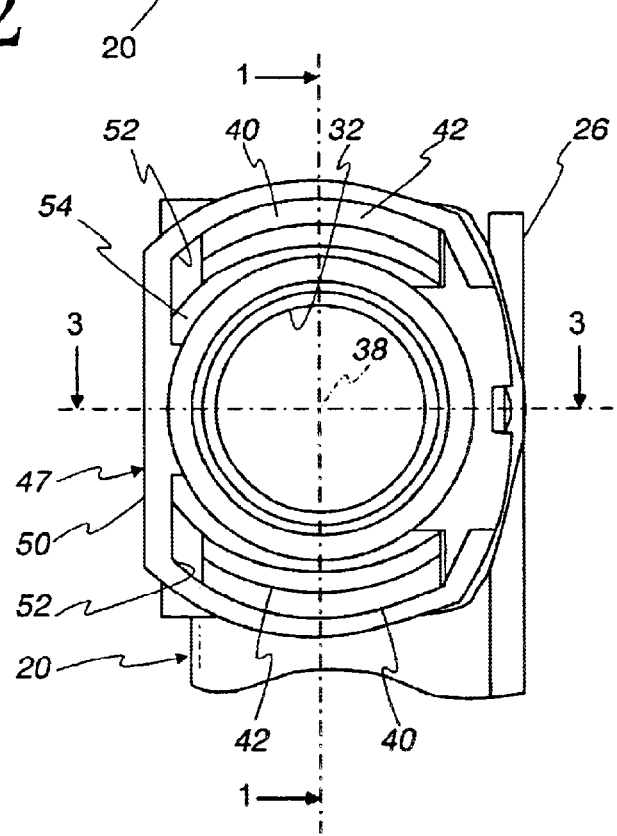
FIG. 2 is an elevational view taken from the right side of FIG. 1.
Figure 5:
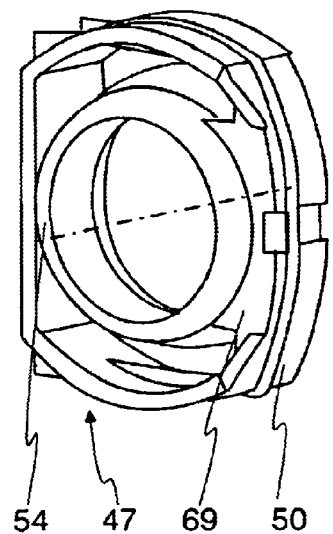
FIG. 5 is a perspective view of the second coupling part exploded away from the first coupling part shown in FIG. 4.

The second coupling part 47 has a nominally oval radially outer peripheral wall 50 as seen in FIGS. 2 and 5. Just inwardly of the wall 50, and diametrically opposite the axis 38, that is, spaced along the major axis of the oval shape of the wall 50, are arcuate apertures 52 which are sized to snugly receive the fingers 40. Radially inwardly of the apertures 52 and thus the radially outer perimeter or wall 50, the second coupling part 47 includes a radially inwardly located, generally circular wall 54 having an inner surface 56 (FIGS. 1 and 3) and an outer surface 58. The radially inner surface 56 is generally cylindrical and sized to just fit about the outer surface 32 of the hollow cylindrical wall 30 of the first coupling part. The outer surface 58 is formed to fit within the radially inner surface 46 of the fingers 40 as best seen in FIG. 1 and thus, the radially inner circular wall 54 may be received in the space between the fingers 40 and the hollow cylindrical wall 30 as seen in FIG. 1.

Figure 3:
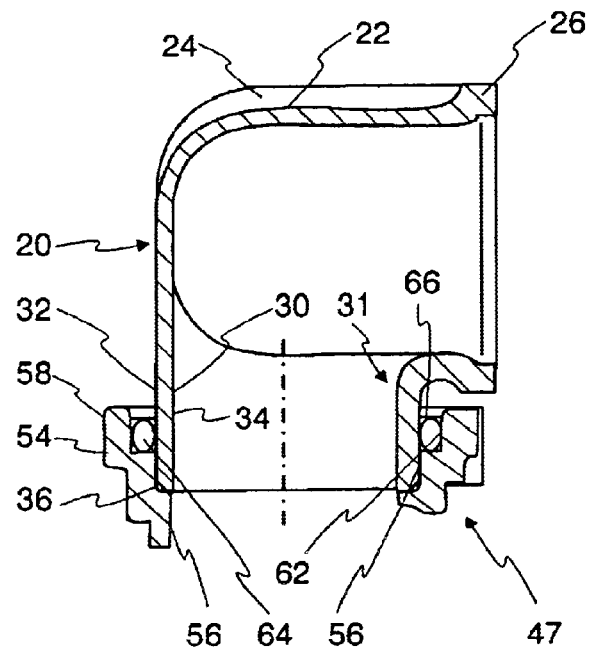
FIG. 3 is a horizontal, fragmentary sectional view taken approximately along the line 3—3 in FIG. 2.

On its axially innermost end 60, the second coupling part 47, and specifically the circular wall 54, includes a radially inwardly opening peripheral groove 62 which in turn receives an O-ring seal 64 which sealingly engages the radially outer surface 32 of the hollow cylindrical wall as seen in both FIGS. 1 and 3. For ease in forming, the groove 62 opens to the axially interior end 60 of the circular wall 54 and if desired, a snap ring 66 may be introduced into the groove 62 to hold the O-ring seal 64 in place as illustrated in both FIGS. 1 and 3.

The circular wall 54, and the interior surface 56 thereof are in alignment with the interior surface 34 of the hollow cylindrical wall 30 to provide a heat exchange fluid passage to the interior of the header 20. A web 69 (FIG. 5) extends between the radially outer wall 50 of the second coupling part and the circular wall 36 in areas between the openings 52 which receive the fingers 40. Thus the two components of the second coupling part 47 are integral with one another and may be formed as a unitary part be injection molding, using any of a variety of known plastic materials.

It will also be appreciated that, though not shown in detail in FIGS. 1–6, the radially inner wall 54 is the end, or is connected to the end of a heat exchange fluid conduit as may be desired.

As best seen in FIG. 1, the radially outer wall 50 of the second coupling part is provided with circumferentially directed slots 70 which, as seen in FIG. 1, align with the grooves or slots 44 in the fingers 40. A retaining piece, typically a resilient snap ring 72, can be inserted in the slots 70 to lodge in the grooves 44 to prevent relative axial movement between the two component parts upon assembly. In many cases, the snap ring will already be in place in the slots 70 in the radially outer wall 50 of the second coupling part and be cammed back into the slots 70 by the bevelled surface 42 on the ends of the fingers 40 and then simply drop into the slots 44 as a result of inherent resilience to effectuate the coupling.

It will be appreciated that the coupling assembly can be effectuated simply by axial movement of the second coupling part relative to the first coupling part and that no rotative movement of either is required. The apertures 52 cooperate with the fingers 40 to provide adequate guidance during the assembly process in terms of aligning the two coupling parts 31, 47 as they are being moved relatively towards one another.

Figure 7:
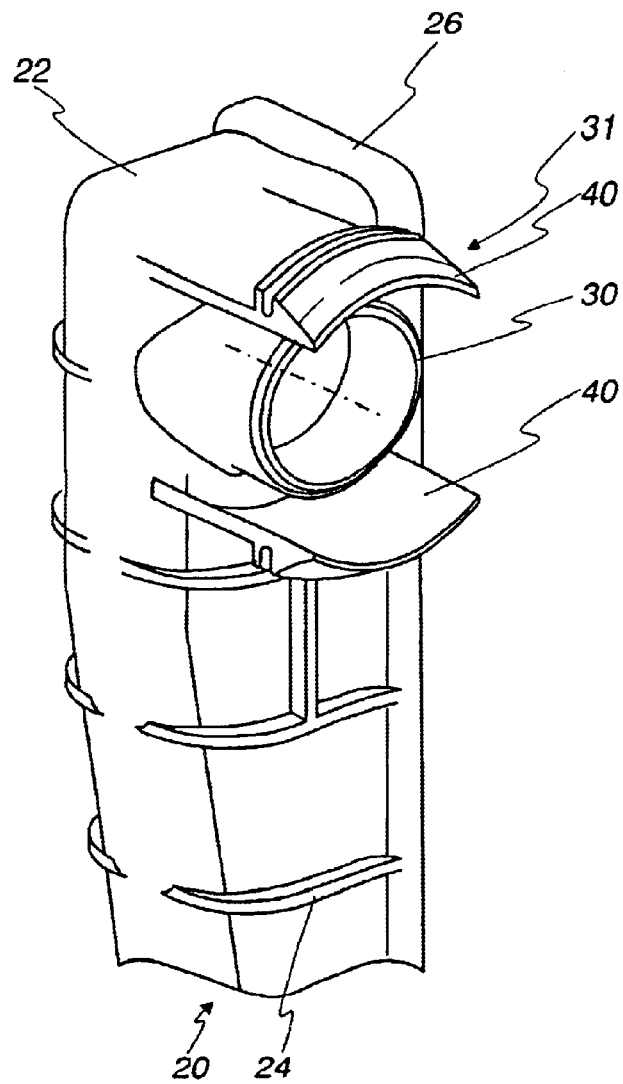
FIG. 7 is a fragmentary, perspective view of an alternative embodiment of a first coupling part attached to a plastic header.
Figure 8:
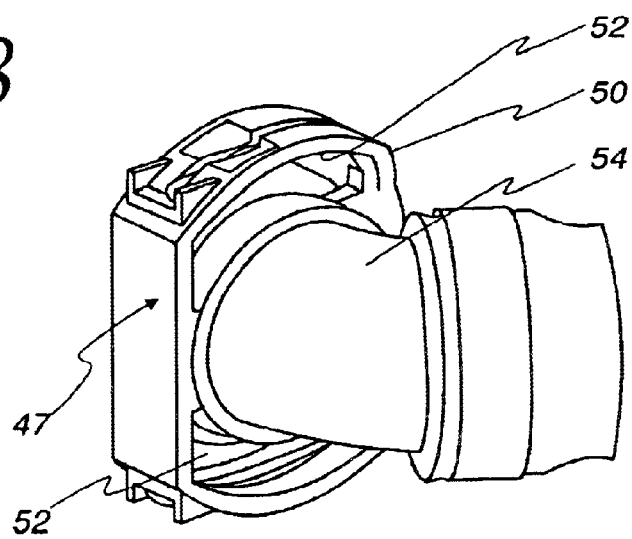
FIG. 8 is a fragmentary, perspective view of the second coupling part exploded away from the first coupling part shown in FIG. 7.
Figure 9:
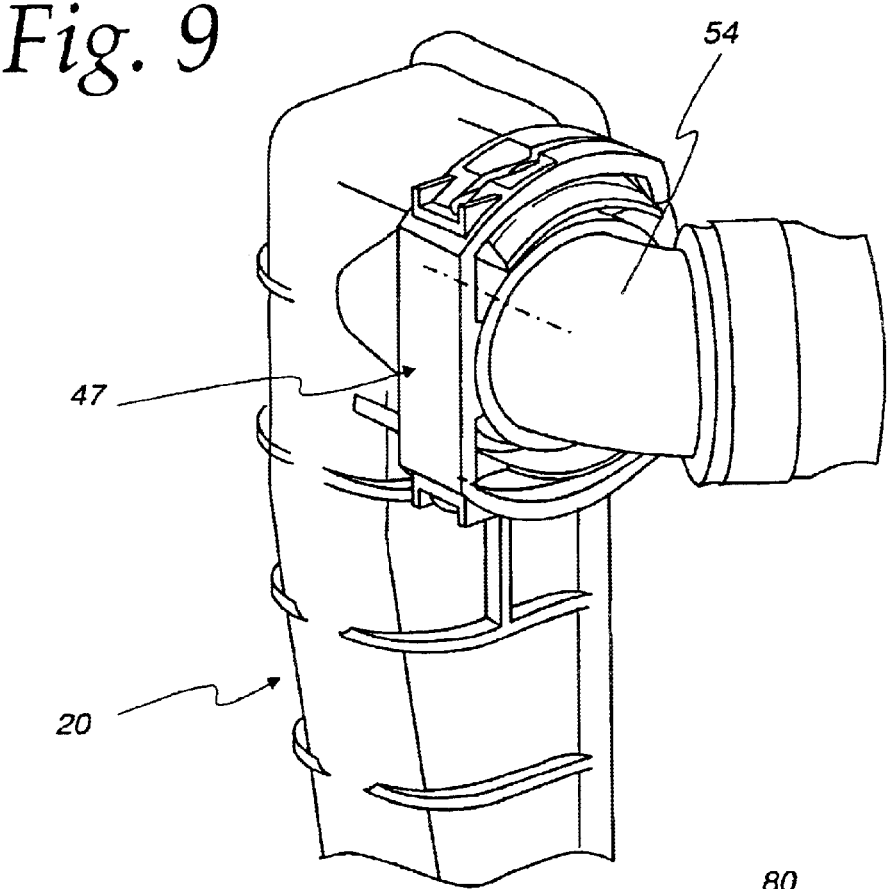
FIG. 9 is a fragmentary, perspective view of the first and second coupling parts according to the alternative embodiment secured to one another.
Figure 10:
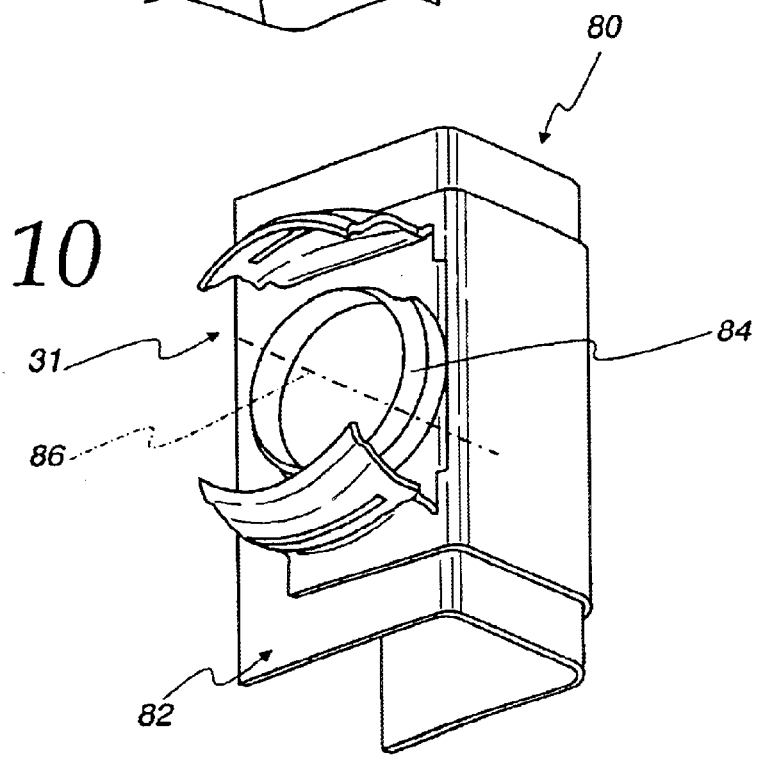
FIG. 10 is a fragmentary, perspective view of a metallic header tank having one coupling part applied thereto.
Figure 11:
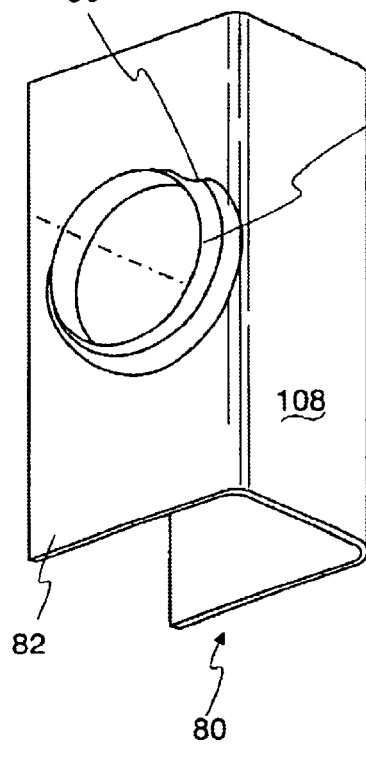
FIG. 11 is a fragmentary, perspective view of part of the first coupling part as applied to a header tank.
Figure 12:
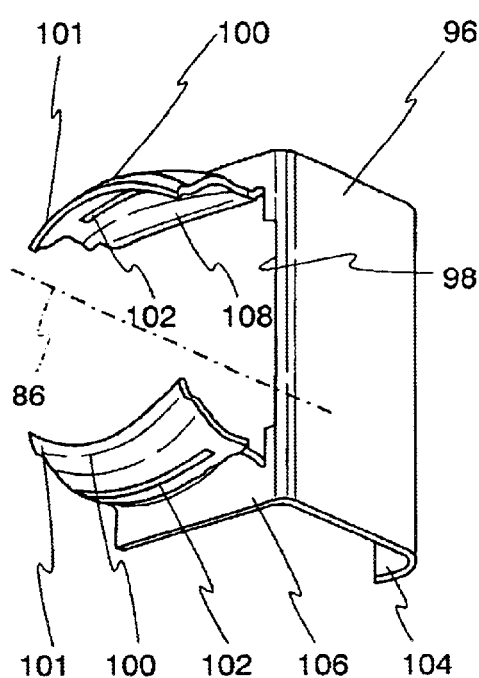
FIG. 12 is a fragmentary, perspective view of an additional piece used in the first coupling part according to the form of the invention shown in FIGS. 10 and 11.

The showings in FIGS. 7–9 are substantial mirror images of FIGS. 4–6 respectively and substantially identical, except that, as can be seen in both FIGS. 8 and 9, the radially inner circular wall 54 of the second coupling part 47, rather than being straight, is shown as curved. This embodiment is also formed of plastic. The actual configuration ultimately selected will, of course, depend upon the environment of the installation, spacial requirements thereof and the location of other system components to which the heat exchanger is to be connected.

Turning now to FIGS. 10–15, an alternate embodiment of the invention is illustrated. As mentioned above, the embodiments shown in FIGS. 1–9 are preferably formed of plastic, including a plastic header tank 20. However, as is well known, header tanks are often formed of metal and the embodiment of FIGS. 10–15 is intended to provide a coupling for such metal tanks.

In the embodiment shown in FIGS. 10–15, the second coupling part 47 is identical to that heretofore described and will not be redescribed in the interest of brevity.

On the other hand, the first coupling part 31 includes the same components but which are formed somewhat differently by reason of the use of metal in forming the header tank.

A metal header tank, generally designated 80, is somewhat schematically shown in FIGS. 10, 11 and 13–15 and includes a generally U-shaped wall 82. Within a flat part of the wall 82, a radially inner, hollow cylindrical wall 84 is formed utilizing conventional metal forming techniques. The hollow cylindrical wall 84 defines an axis 86 and at its axially remote end 88 from the header 80, the same may be bevelled as shown at 90 to allow the O-ring seal carried by the radially inner circular wall 54 of the second coupling part 47 to readily slip onto the outer surface 92 of the hollow cylindrical wall 84.

The first coupling part 31 in this embodiment requires the use of an additional component to provide fingers corresponding to the fingers 40. The additional component is a J-shaped metal piece 96 has, in its long leg, an opening 98 formed and the metal previously occupying the opening 98 is formed into diametrically opposed fingers 100 which are arcuate and concave in the direction of the axis 86. In their radially outer surfaces, the fingers 100 have ramped surfaces 101 extending to generally circumferentially directed, outwardly opening grooves or slots 102. In the usual case, because of the thinness of the metal of the additional piece 96, the elements 102 will be slots rather than grooves.

The short leg 104 is spaced from the long leg 106 in which the opening 98 is formed by a distance about the same or just slightly less than the width of the bight 108 of the U-shaped wall 82. It will be noted that opening 98 extends all the way to the side of the long leg 106 and as a consequence, the additional piece 96 may be slipped over the tank 80 and held in place by the clamping action between the short leg 104 and the long leg 106 of the additional piece 96. The same may be shifted so that the fingers 100 are aligned with respect to the hollow cylindrical wall 84 to define a desired spacing between the outer surface 92 thereof and the inner surfaces 108 of the fingers 100, which spacing should be sufficient to receive the second coupling part in the same manner as previously described in connection with the embodiments shown in FIGS. 1–9. The additional piece is then metallurgically bonded to the tank 80 as by soldering, brazing or even welding.

Figure 13:
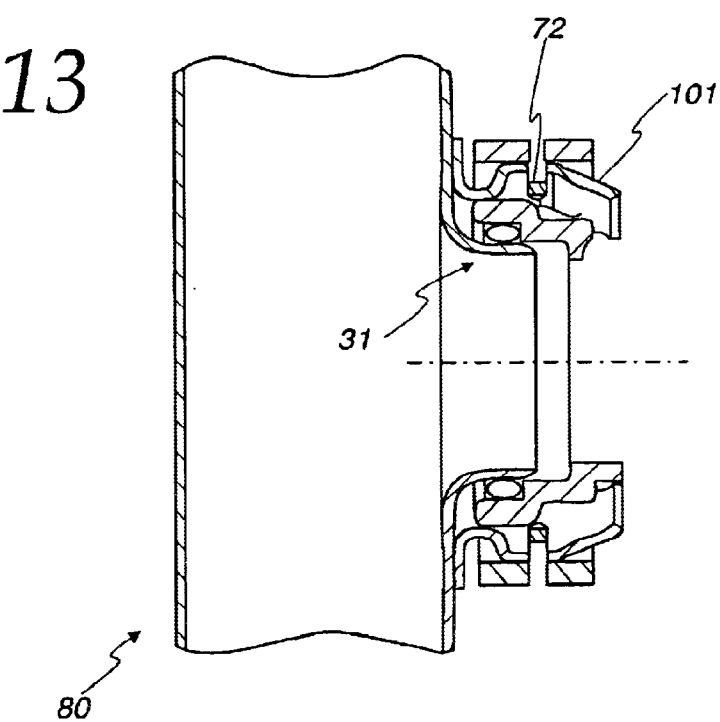
FIG. 13 is a view similar to FIG. 1 but of the embodiment of FIGS. 10–12 and taken approximately along the line 13—13 in FIG. 14.
Figure 14:
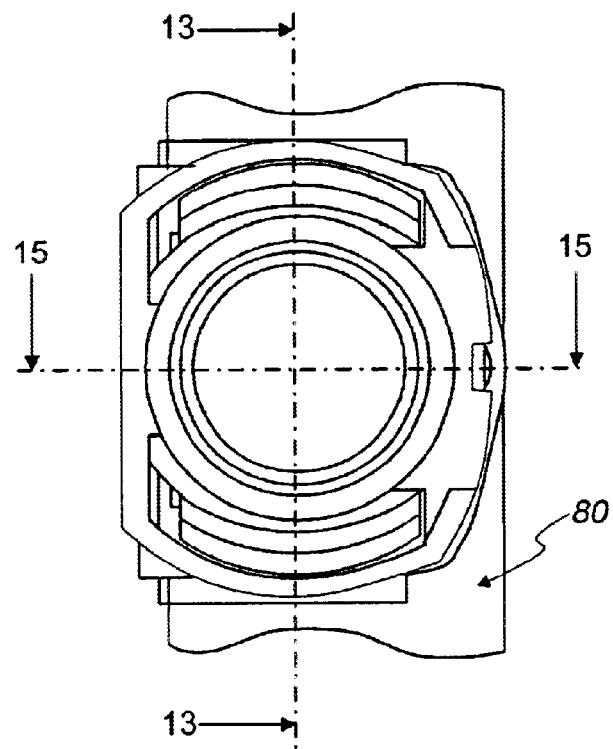
FIG. 14 is a fragmentary, elevation taken from the right side of FIG. 13.
Figure 15:
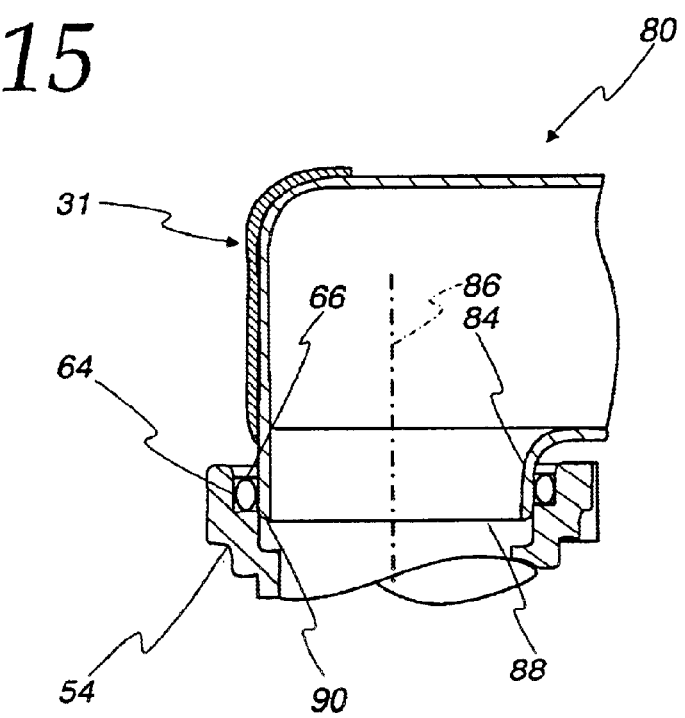
FIG. 15 is a view similar to FIG. 3 but of the embodiment shown in FIGS. 10–14 and taken approximately along the line 15—15 in FIG. 14.

The second coupling part 47 may be slipped upon the first coupling part 31 in this embodiment in the same manner mentioned previously with the snap ring 72 entering the slots or grooves 102 in the fingers 100 to maintain an assembled relation as shown in FIG. 13. At this time, the O-ring seal 64 will sealingly engage the outer surface 92 of the hollow cylindrical wall 84 to establish a seal while the snap ring 72 establishes a connection between the two coupling parts 31 and 47.

It will be appreciated that the seal 64 and snap ring 72 are in substantially the same radial plane and thus, an extremely axially short coupling results to provide for a compact assembly. And again, with either embodiment, no twisting of the coupling is required during assembly. Rather, strictly axial relative movement is sufficient to effect assembly. The two coupling parts 31, 47 may be fully assembled, including the O-ring 64 within the groove in the circular wall 54 of the second coupling part and with the snap ring 72 in place in the slots 70, also in the second coupling part 47. Thus assembly is quick and requires a minimum of movement as well as a minimum of space in which to effect assembly.

What is claimed is:

1. A coupling for connecting a fluid conduit to the header tank of a heat exchanger by relative axial movement, comprising:

a first coupling part on one of said header tank and said conduit;

a second coupling part on the other of said header tank and said conduit and sealingly coupled to said first coupling part;

said first coupling part including a radially inner, hollow cylindrical wall defining an axis and a radially outer surface, diametrically opposite, axially directed fingers spaced radially outward of said cylindrical wall and attached thereto, and radially outwardly opening grooves or slots in sides of said fingers remote from said cylindrical wall and generally transverse to said axis;

said second coupling part including a generally circular radially inner wall sized to be axially received between said cylindrical wall and said fingers and having an interior surface facing the radially outer surface of said cylindrical wall, a radially inwardly opening groove in said interior surface, a circular seal in said radially inwardly opening groove and sealingly engageable with the radially outer surface of said cylindrical wall when said coupling is assembled, a radially outer wall sized to fit about said sides of said fingers, and slots in said radially outer wall generally transverse to said axis and alignable with said radially outwardly opening grooves; and a retaining clip disposed in said slots and entering said circumferentially directed grooves when said coupling is assembled.

2. The coupling of claim 1 wherein said fingers are arcuate about said axis and concave in the direction of said axis and said radially outer wall includes diametrically opposite arcuate sections concave in the direction of said axis.

3. The coupling of claim 1 including a plastic tank for a heat exchanger wherein one of said coupling parts is plastic and formed integrally with said tank.

4. The coupling of claim 3 wherein said one of said coupling parts is said first coupling part and said hollow cylindrical wall opens to the interior of said tank through a wall thereof and said fingers extend from said wall.

5. The coupling of claim 1 including a metal tank and said first coupling part is on said metal tank, said hollow cylindrical wall being formed in a wall of said tank and said fingers being formed in an additional part fitted and secured to said tank about hollow cylindrical wall.

6. The coupling of claim 5 wherein said additional part is shaped to be complementary to the shape of the tank at the hollow cylindrical wall so as to be fitted on the tank and secured thereto by a metallurgical bond.

7. A coupling for connecting a fluid conduit to the header tank of a heat exchanger by relative axial movement, comprising:

a first coupling part on one of said header tank and said conduit;

a second coupling part on the other of said header tank and said conduit and sealingly coupled to said first coupling part;

said first coupling part including a radially inner, hollow cylindrical wall defining an axis and a radially outer surface, and diametrically opposite, axially directed fingers spaced radially outward of said cylindrical wall and attached thereto;

said second coupling part including a generally circular radially inner wall sized to be axially received between said cylindrical wall and said fingers and having an interior surface facing the radially outer surface of said cylindrical wall, a radially inwardly opening groove in said interior surface, a circular seal in said radially inwardly opening groove and sealingly engageable with the radially outer surface of said cylindrical wall when said coupling is assembled, a radially outer wall sized to fit about said sides of said fingers; and a retaining means for engaging said axially directed fingers and said radially outer wall to hold the coupling parts in assembled relation.

* * * * *